United States Patent [19]

Koch

[11] 4,142,043
[45] Feb. 27, 1979

[54] SUBSTITUTED 2-IMIDAZOLIN-5-ONES

[75] Inventor: Werner Koch, Oberwil/Bl, Switzerland

[73] Assignee: Sandoz Ltd., Basel, Switzerland

[21] Appl. No.: 810,380

[22] Filed: Jun. 27, 1977

Related U.S. Application Data

[60] Continuation of Ser. No. 700,160, Jun. 28, 1976, abandoned, which is a division of Ser. No. 527,472, Nov. 26, 1974, Pat. No. 4,005,080, which is a continuation-in-part of Ser. No. 525,759, Nov. 21, 1974, abandoned.

[30] Foreign Application Priority Data

Nov. 28, 1973 [CH] Switzerland .................. 16697/73
Aug. 16, 1974 [CH] Switzerland .................. 11255/74

[51] Int. Cl.² .............. C07D 401/14; C07D 403/10; C07D 413/10; C07D 413/14
[52] U.S. Cl. .................... 542/433; 542/444; 542/447
[58] Field of Search ............ 542/444, 443, 433; 260/307 A, 307 C; 548/301

[56] References Cited

U.S. PATENT DOCUMENTS

| | | | |
|---|---|---|---|
| 2,882,159 | 4/1959 | Brooker et al. | 548/301 |
| 2,903,452 | 9/1959 | Smith | 542/436 |
| 2,977,371 | 3/1961 | Dixon | 548/321 X |
| 3,538,222 | 11/1970 | Shukys | 260/307 C X |
| 3,617,170 | 11/1971 | Hansen et al. | 542/443 X |

Primary Examiner—Allen B. Curtis
Attorney, Agent, or Firm—Gerald D. Sharkin; Richard E. Vila; Joseph J. Borovian

[57] ABSTRACT

The present invention relates to compounds of formula I,

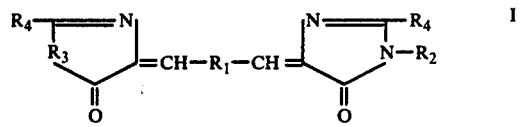

in which $R_1$ signifies a divalent, mono- or binuclear aromatic radical of the carbocylic or heterocyclic series, $R_2$ signifies a hydrogen atom or an unsubstituted or substituted $(C_{1-4})$alkyl, phenyl, naphthyl or mono-or fused binuclear heterocyclic radical which is bound through a carbon atom, $R_3$ signifies an oxygen atom or a group of formula $>N-R_5$ in which $R_5$ has one of the significances given above for $R_2$, and each of the $R_4$'s independently, signifies a mono- or binuclear aromatic radical of the carbocyclic or heterocyclic series,
or mixtures of such compounds, which compounds and mixtures are useful as colorants.

26 Claims, No Drawings

SUBSTITUTED 2-IMIDAZOLIN-5-ONES

This is a continuation of application Ser. No. 700,160, filed June 28, 1976 now abandoned, which in turn is a division of application Ser. No. 527,472, filed Nov. 26, 1974, now issued as U.S. Pat. No. 4,005,080, which in turn is a continuation-in-part of Ser. No. 525,759, filed Nov. 21, 1974, now abandoned.

The present invention relates to heterocyclic compounds and mixtures thereof, their production and use.

More particularly, the present invention provides compounds of formula I,

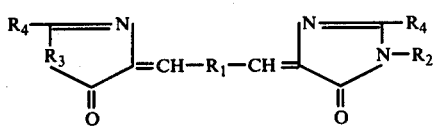   I in which $R_1$ signifies a divalent, mono- or binuclear aromatic radical of the carbocyclic or heterocyclic series, $R_2$ signifies a hydrogen atom, an unsubstituted or substituted $(C_{1-4})$alkyl, phenyl, naphthyl or mono- or fused binuclear heterocyclic radical which is bound through a carbon atom, $R_3$ signifies an oxygen atom or a group of formula $>N-R_5$ in which $R_5$ has one of the significances given above for $R_2$, and each of the $R_4$'s, which may be the same or different, signifies a mono- or binuclear aromatic radical of the carbocyclic or heterocyclic series which is bound through a carbon atom, or mixtures of such compounds.

In the compounds of formula I, where $R_1$ is mononuclear such $R_1$ may be bonded through any two positions thereof but preferably in relative meta- or para- or equivalent positions, i.e. with at least one ring member atom between the positions of attachment. In the case of binuclear systems any radicals may be used, however those radicals where at least one ring member is between the bonds are preferred, e.g. 1,3-, 1,4-, 1,5- and 2,6-naphthylene etc.

In the compounds of formula I, $R_1$ is preferably a phenylene radical, a naphthylene radical, a bivalent radical of furan, thiophene, pyrrole or pyridine or a bivalent radical of benzofuran, benzothiophene, benzopyrrole or benzopyridine in which the bonds are in the 2,5- or 2,6- or para- position, all of which radicals may bear up to a total of two substituents per ring and selected from the group consisting of chlorine and bromine atoms, hydroxyl, methyl, methoxy and ethoxy groups (up to two of any of these), trifluoromethyl, $(C_{2-4})$alkanoylamino, benzoylamino and nitro groups (only one of any of these). More preferably $R_1$ signifies a phenylene, particularly 1,4-phenylene, thienylene, particularly 2,6-thienylene, or naphthylene, particularly 1,4- or 2,6-naphthylene, all unsubstituted or substituted as above. Most preferably $R_1$ signifies unsubstituted or substituted 1,4-phenylene, particularly unsubstituted 1,4-phenylene.

$R_2$ preferably signifies a hydrogen atom; an unsubstituted $(C_{1-4})$alkyl radical; a $(C_{1-4})$alkyl radical mono-substituted by a chlorine or bromine atom, a hydroxy, $(C_{1-4})$alkoxy, $(C_{1-4})$alkylamino, di-$(C_{1-4})$alkylamino, $(C_{2-4})$alkanoyloxy, $(C_{1-4})$alkoxycarbonyl, $(C_{1-4})$alkoxycarbonyloxy or benzoyloxy; an unsubstituted phenyl radical or a phenyl radical substituted by a total of up to three substituents, preferably up to two substituents, more preferably one substituent, selected from the group consisting of chlorine and bromine atoms, and methyl groups (up to three of any of these), $(C_{1-4})$alkoxy, $(C_{1-4})$alkoxycarbonyl, cyano and nitro groups (up to two of any of these), hydroxy, $(C_{1-4})$alkylamino, di-$(C_{1-4})$alkylamino, $(C_{2-4})$alkanoylamino and $(C_{1-4})$alkoxycarbonylamino groups (only one of any of these); a naphthyl radical; pyridyl-2, -3 or -4; pyrimidyl-2 or -4; 2,4-dimethylpyrimidyl-6-; thienyl-2; thiazolyl-2; benzothiazolyl-2; or 5-methyl-isoxazolyl-3.

Each of the symbols $R_4$, independently, preferably signifies an unsubstituted phenyl or naphthyl radical; a phenyl or naphthyl radical substituted by a total of up to three substituents, preferably up to two substituents, more preferably one substituent selected from the group consisting of chlorine and bromine atoms and methyl groups (up to three of any of these), $(C_{1-4})$alkoxy and nitro groups (up to two of any of these), hydroxy, cyano, $(C_{1-4})$alkylamino, di-$(C_{1-4})$alkylamino, $(C_{1-4})$alkoxycarbonyl, $(C_{1-4})$alkoxy $(C_{1-4})$alkoxycarbonyl, $(C_{2-4})$alkanoyloxy, $(C_{2-4})$alkanoylamino, $(C_{1-4})$alkoxycarbonylamino and sulpho groups (only one of any of these); pyridyl-2, -3 or -4; a pyrazinyl radical; thienyl-2 or pyrryl-2 or -3. The $R_4$'s are preferably the same.

It will be appreciated that, when $R_4$ signifies a phenyl radical substituted by a sulpho group, the compounds of formula I may be in the free acid or salt form, suitable salts are the alkali metal salts.

The present invention also provides a process for the production of compounds of formula I, as defined above, or mixtures thereof, comprising condensing a compound of formula II,

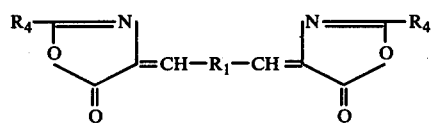   II in which $R_1$ and $R_4$ are as defined above, with a compound of formula III, $H_2N - R_2$   III in which $R_2$ is as defined above,
or a mixture of compounds of formula III, preferably in a 1:1 or 1:2 molar ratio.

Where it is desired to obtain a compound of formula I, wherein $R_4$ signifies a sulpho bearing phenyl group, it is preferred first to prepare the non-sulphonated compound and then to sulphonate such compound.

If a single compound of formula III is reacted with a compound of formula II in a 1:1 molar ratio, a mixture of compounds comprising compounds where $R_3$ is O and compounds where $R_3$ is $>N-R_2$ are obtained. However, if a single compound of formula III is reacted with a compound of formula II in a 2:1 molar ratio, a substantially pure product, where $R_3$ is $>N-R_2$, is obtained.

The reaction of the compounds of formula II with the compounds of formula III where $R_2$ has a significance other than hydrogen is preferably carried out in anhydrous alkane acids containing 2 to 4 carbon atoms or alkane acid anhydrides containing 4 to 8 carbon atoms, glacial acetic acid and acetic anhydride being preferred. The reaction is also preferably conducted in the presence of an alkali metal salt of an alkane acid containing 2 to 4 carbon atoms. Suitable reaction temperatures are in the range of from about 100° C. to 200° C.

A preferred method of preparing the compounds of formula I, where $R_2$ signifies hydrogen and $R_3$ signifies $>N-R_5$, where $R_5$ has a significance other than hydrogen, is to react a compound of formula II, as defined above, with a compound of formula $H_2N-R_5$, where $R_5$ has a significance other than hydrogen, in a 1:1 molar ratio and subsequently to react the product with ammonia.

When ammonia is used as the compound of formula III, i.e. $R_2$ is hydrogen, the reaction is preferably effected in an aqueous-alkaline medium. It is preferably conducted in an autoclave at temperatures ranging from about 75° to 160° C. In such cases an excess concentrated aqueous ammonia solution is generally used.

Sulphonation of the condensation product may be carried out by known methods.

The compounds of formula II are produced in a manner analagous to that described by E. Erlenmeyer, Liebig's Annalen, 1893, 275, 1.

Preferred compounds of formula I, are those of formula Ia,

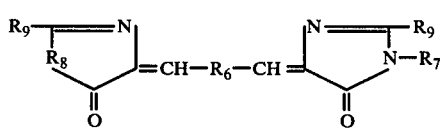

in which $R_6$ signifies an unsubstituted 1,4-phenylene radical; a 1,4-phenylene radical substituted by up to two substituents selected from the group consisting of chlorine and bromine atoms, hydroxyl, methyl, methoxy and ethoxy groups; a 1,4-, 1,5- or 2,6-naphthylene radical or a 3,4-dibromothienylene-2,5-radical, $R_7$ signifies a hydrogen atom; an unsubstituted $(C_{1-4})$alkyl radical; a $(C_{1-4})$alkyl radical substituted by a hydroxy, $(C_{1-4})$alkoxy, $(C_{1-4})$alkylamino or di-$(C_{1-4})$alkylamino group; an unsubstituted phenyl radical or a phenyl radical substituted by a total of up to two substituents, preferably one substituent, selected from the group consisting of chlorine and bromine atoms, methyl, cyano and nitro groups (up to two of any of these), $(C_{1-4})$alkoxy, $(C_{1-4})$alkoxycarbonyl, acetylamino, and propionylamino groups (only one of any of these); or a 2-pyridyl radical, $R_8$ signifies an oxygen atom or $>N-R_7$ in which $R_7$ is as defined above, and the $R_9$'s are the same and signify an unsubstituted phenyl radical; a phenyl radical substituted by a total of up to two substituents, preferably one substituent, selected from the group consisting of chlorine and bromine atoms, nitro, methyl and $(C_{1-4})$alkoxy groups (up to two of any of these); cyano, hydroxy, acetoxy, propionyloxy, methoxycarbonyl, ethoxycarbonyl, methoxyethoxy carbonyl, acetylamino, sulpho and propionylamino groups (only one of any of these); a naphthyl-1 or -2 radical; or a naphthyl-1 or -2 radical substituted by a sulpho group; 2-hydroxynaphthyl-3, 2-hydroxysulpho-naphthyl-3, pyridyl-2, -3 or -4; thienyl-2, pyrryl-2 or -3; or pyrazinyl.

In the dyes of formula Ia, $R_6$ preferably signifies an unsubstituted 1,4-phenylene radical or a 1,4-phenylene radical substituted by a total of up to two substituents, selected from the group consisting of chlorine atoms, methyl and methoxy groups, more preferably, $R_6$ signifies an unsubstituted 1,4-phenylene radical, $R_7$ preferably signifies a hydrogen atom; an unsubstituted $(C_{1-4})$alkyl radical; a $(C_{1-4})$alkyl radical substituted by a hydroxy, methoxy, ethoxy, methylamino, dimethylamino, ethylamino or diethylamino group; an unsubstituted phenyl radical, a phenyl radical substituted by a total of up to two substituents, preferably one substituent, selected from chlorine and bromine atoms and methyl groups (up to two of any of these), methoxy, ethoxy, methoxycarbonyl and ethoxycarbonyl groups (only one of any of these); or a 2-pyridyl radical, more preferably, $R_7$ signifies a hydrogen atom; an unsubstituted $(C_{1-4})$alkyl radical; a $(C_{1-4})$alkyl radical substituted by a hydroxy, methoxy, ethoxy or dimethylamino group; an unsubstituted phenyl radical; a phenyl radical substituted by a total of up to two substituents, preferably one substituent, selected from the group consisting of chlorine and bromine atoms and methyl groups (up to two of any of these), methoxy, ethoxy, methoxycarbonyl and ethoxycarbonyl groups (only one of any of these); or a 2-pyridyl radical, or even more preferably, $R_7$ signifies a hydrogen atom, an unsubstituted phenyl radical or a phenyl radical substituted by a chlorine atom, a methyl, methoxycarbonyl or ethoxycarbonyl group.

$R_9$ preferably signifies an unsubstituted phenyl radical; a phenyl radical substituted by a total of up to two substituents, preferably one substituent, selected from the group consisting of chlorine and bromine atoms and methyl groups (up to two of any of these), cyano, nitro, methoxy, ethoxy, methoxycarbonyl and ethoxycarbonyl groups (only one of any of these); or a 2-, 3- or 4-pyridyl radical, more preferably $R_9$ signifies an unsubstituted phenyl radical.

The compounds of formula I or mixtures thereof, which contain one or two sulphonic acid or salt groups contained in $R_4$, are useful as anionic dyes which build up from a neutral bath. Suitable substrates which may be dyed with such dyes include synthetic or natural polyamides, cellulose fibres or paper. Dyeing may be carried out in conventional manner for dyeing with anionic dyes.

The compounds of formula I or mixtures thereof, wherein one or both of $R_2$ and $R_5$, when $R_3$ signifies $>N-R_5$, have a significance other than hydrogen and which contain no sulpho groups are useful as disperse dyes. They may be used to exhaust dye, pad dye or print substrates of semi-synthetic, synthetic, hydrophobic, high molecular weight organic fibres. Suitable substrates consist of or comprise linear, aromatic polyesters, cellulose 2½ acetate, cellulose triacetate or synthetic polyamides. The dyestuffs may be processed in known manner to form dyeing preparations, for example, by grinding in the presence of dispersion agents and/or fillers, optionally with subsequent vacuum or atomizer drying. Conventional dyeing and printing methods may be employed, for example, those described in French Pat. No. 1,445,371. The substrate may be in loose yarn, fibre or fabric form.

The dyeings obtained show notable fastness, for example fastness to light, thermofixation, pleating, fastness to water, sea water, washing, perspiration and solvents, including dry cleaning liquors, to lubricants, rubbing, cross dyeing, ozone, gas fumes and chlorine. The dyeings show stability to the pre-cure and post-cure permanent press finishing processes, to soil release finishes, to reducing action in the dyeing of wool, and as dispersion dyes they reserve wool and cotton.

The compounds of formula I or mixtures thereof, wherein $R_2$ and $R_5$, if $R_3$ signifies $>N—R_5$, signifies hydrogen, are useful as pigments. They are suitable for pigmenting plastics or synthetic resins in the mass. As examples of such materials may be given polyethylene, polystyrene, polyvinyl chloride, rubber and synthetic leather. They may be incorporated in such materials in the presence or absence of solvents. They are also suitable as pigments in surface coating media, whether of an oil or water base, and in lacquers of various composition or spinning solutions of viscose or cellulose acetate. The compounds are also suitable for use in printing inks, for dyeing paper in the stock, for coating textiles and for pigment printing.

The dyeings obtained have notable heat resistance and fastness properties and notable stability to chemicals.

The properties of the pigments may be further improved by an after-treatment of the crude pigments in organic solvents in which the pigments themselves are insoluble at elevated temperatures, e.g. 110°–200° C. Suitable such organic solvents include chlorobenzenes (nitrene), nitrobenzene, dimethyl formamides, glacial acetic acid, ethylene glycol or quinoline.

It will be appreciated that if mixtures of the compounds of formula I are obtained, these mixtures may, if desired, be separated, although it is preferred to use such obtained mixtures in the admixed forms.

The following Examples further serve to illustrate the invention. In the Examples the parts and percentages are by weight and temperatures are in degrees Centigrade.

EXAMPLE 1

42 parts of the condensation product of terephthaldehyde and hippuric acid, of formula a

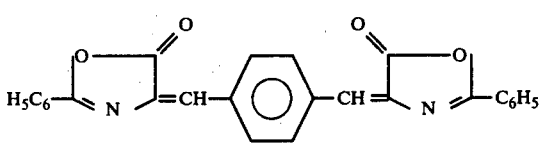

are suspended in 1000 parts of glacial acetic acid, 9.3 parts of aniline are added, it is heated to a temperature in the range of from 30° to 40° and 4 parts of newly molten, anhydrous sodium acetate are added slowly in small portions. After adding a further 200 parts of glacial acetic acid, the suspension which is stirred well is boiled for four hours with reflux cooling, it is then cooled, the residue is filtered off, washed so as to be free from acid with a little petroleum ether, washed finally with water, and then dried. The slightly reddish yellow product, which is a mixture of compounds of b and c,

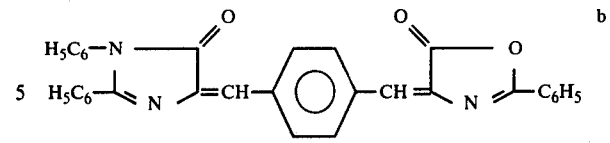

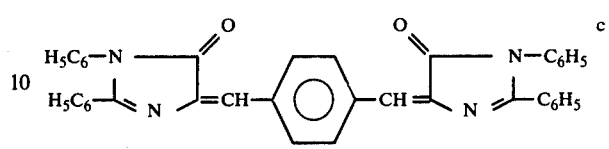

thus obtained, dyes polyester fibre material in yellow shades with notable fastness.

The melting point of the dye is 242°, and the electron spectrum in dimethyl formamide is:
$\lambda_{max.1} = 436$ mµ
$\lambda_{max.2} = 466$ mµ

EXAMPLE 2

16.8 Parts of the compound of formula a of Example 1 and 7.5 parts of aniline are suspended in 150 parts of glacial acetic acid, 0.5 parts of newly molten sodium acetate are added slowly and it is boiled at reflux for 5 hours. After cooling, filtering and washing with petroleum ether and water, the slightly reddish-yellow residue of formula

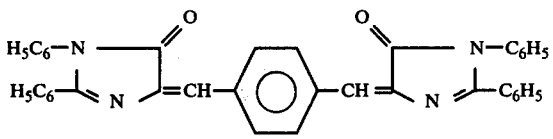

is dried. It dyes polyester fibre material in yellow shades with notable fastness.

The dye has a melting point of 264°, and the electron spectrum in dimethyl formamide is as follows:
$\lambda_{max.1} = 450$ mµ    (log $\epsilon = 4.5$)
$\lambda_{max.2} = 457$ mµ    (log $\epsilon = 4.4$) Shoulder

EXAMPLE 3

42 Parts of the compound of formula a as shown in Example 1 are heated to 130° for 30 hours in an autoclave in the presence of 22 parts of sodium carbonate, 428 parts of concentrated ammonia solution and 120 parts of water, the pressure increases to 6 atmospheres. After cooling, the deep red insoluble substance is filtered off, washed to neutral with water and dried.

Mass spectrum (m/e = 418), elementary analysis ($C_{26}H_{18}N_4O_2$) and infra-red spectrum demonstrate the presence of the compound of formula

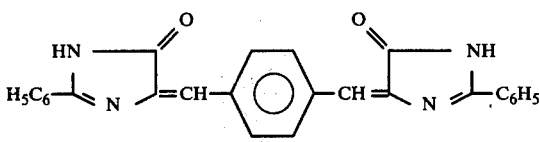

which has notable pigment properties; notably the fastness to migration, and the depth of colour of the brilliant yellow dyeings in polyvinyl chloride.

The dye of the above formula may be converted by treatment for three hours at 50° to 60° in 20% oleum, pouring out the cooled reaction mixture and filtering, to form a hydro-soluble dye of formula

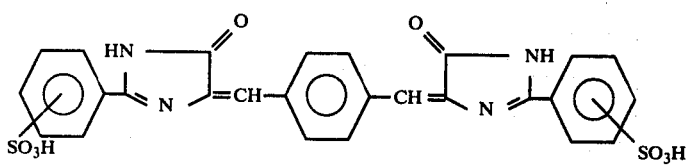

which may be used e.g. as a paper dye.

EXAMPLE 4

In accordance with the procedure of Example 2, if instead of aniline an equimolar amount of para-aminobenzoic acid ethylester is reacted, a valuable dispersion dyestuff of formula

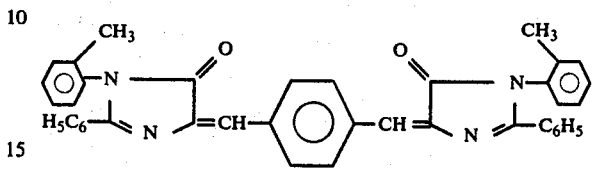

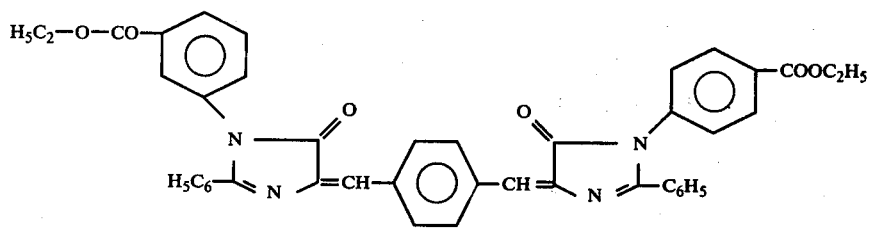

is obtained, the nuclear resonance spectrum, elementary analysis ($C_{44}H_{34}N_4O_6$) and mass spectrum (m/e = 714) demonstrate the above structure. The electron spectrum (in dimethyl formamide):
$\lambda_{max.}$ = 465 mµ    (log ε = 4.5), Schulter.

EXAMPLE 5

In accordance with the procedure of Example 2, if instead of aniline an equimolecular amount of 1-amino-3-methoxypropane is used, the dye of formula

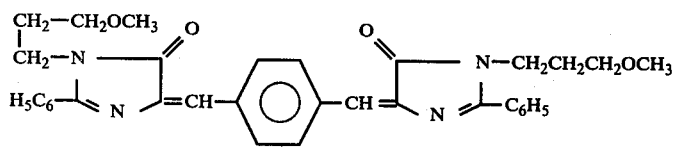

is obtained, which is demonstrated by the nuclear resonance spectrum, elementary analysis ($C_{34}H_{34}N_4O_4$) and mass spectrum (m/e = 562).

The electron spectrum (in dimethyl formamide):
$\lambda_{max}$ = 445 mµ    (log ε = 4.7)

The dyestuff gives fast brilliant yellow dyeings on hydrophobic synthetic fibre material.

EXAMPLE 6

In accordance with the procedure of Example 2, if instead of aniline equimolecular amounts of
a) ortho-toluidine
b) 1-N-dimethylamino-3-propylamine are used, the following are obtained:
a) the dyestuff of formula mass spectrum m/e = 598,
electron spectrum (in dimethyl formamide):
$\lambda_{max\ 1}$ = 455 mµ    (log ε = 4.75)
$\lambda_{max\ 2}$ = 480 mµ    (log ε = 4.65)
and b) the dyestuff of formula

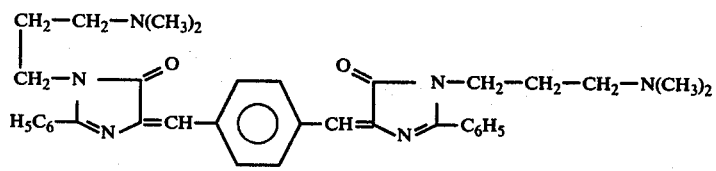

mass spectrum m/e = 588
electron spectrum (in dimethyl formamide):
$\lambda_{max}$ = 488 mµ    (log ε = 4.7).

Both are good dispersion dyestuffs and dye substrates dyeable with dispersion dyes in brilliant yellow shades.

EXAMPLE 7

In accordance with Example 2, if instead of the 7.5 parts of aniline, 3.6 parts of aniline and 4.3 parts of
a) para-toluidine, or respectively
b) ortho-toluidine
are used, then mixtures of dyes are obtained, the physical data of which are determined as follows: electron spectrum (in dimethyl formamide):
a) $\lambda_{max\ 1}$ = 450 mµ,
   $\lambda_{max\ 2}$ = 480 mµ, Shoulder
   melting point = 265°,
b) $\lambda_{max\ 1}$ = 455 mµ,
   $\lambda_{max\ 2}$ = 480 mµ,
   melting point = 260°.

These dyes give dyeings of a brilliant yellow shade with good fastness and affinity on polyester fibres.

EXAMPLE 8

By proceeding in accordance with Example 1, but using 4.65 parts of aniline and 5.35 parts of
a) para-toluidine, or respectively
b) ortho-toluidine,
mixtures of dyes are obtained which have the following physical data:
a) $\lambda_{max\,1} = 435$ mµ,
$\lambda_{max\,2} = 464$ mµ,
melting point = 240°;
b) $\lambda_{max\,1} = 435$ mµ, $\lambda_{max\,2} = 466$ mµ,
melting point = 240°.

EXAMPLE 9

By proceeding in accordance with Example 1, but instead of the aniline using 8.25 parts of anthranilic acid ethylester and 8.25 parts of para-aminobenzoic acid ethylester, a mixture of dispersion dyes is obtained, having a melting point of 255° to 260°, and dyeing fibre material consisting of linear, aromatic polyester in brilliant yellow shades with good fastness.

Mixtures of dyes having very similar properties may also be obtained by using instead of the aniline used in Example 1
a) 6.175 parts of para-chloroaniline and
6.175 parts of ortho-chloroaniline, or respectively
b) 6.175 parts of meta-chloroaniline and
6.175 parts of ortho-chloroaniline.
The melting points of the mixtures are:
a) = 242° to 248°
b) = 245° to 248°.

EXAMPLE 10

By proceeding in accordance with Example 2, but using 6.6 parts of anthranilic acid ethylester and 6.6 parts of para-aminobenzoic acid ethylester, a mixture of dispersion dyes is obtained, having a melting point of 260°, and having notable properties as a brilliant yellow dispersion dye.

The mixtures which are produced in a similar manner to that described in Example 1 consist basically of four components, and the mixtures which are produced in a manner similar to that described in Example 2 consist basically of three components but in neither case can the percentage of the individual components be given.

The following table contains further dyestuffs of formula I which are produced in a manner analogous to that of either Example 1 or 2. $R_4$ always signifies a phenyl radical. $R_3$ corresponds in all cases once to an oxygen atom or to the group >N—$R_2$ of the given dyestuff, so that each example represents two dyestuffs. The dyeings of all dyestuffs on synthetic fibre materials result in yellow shades, (with the exception of the dyestuffs of Example 25 which gives orange shades) with strong fluorescence and notable fastness.

Table 1

| Example No. | $R_1$ | $R_2$ |
|---|---|---|
| 10 | para-phenylene | n-propyl |
| 11 | 2,5-dimethyl-1,4-phenylene | —$C_6H_5$ |
| 12 | 2,5-dichloro-1,4-phenylene | —$CH_2CH_2CH_2$—O—$CH_3$ |
| 13 | 2,5-dibromo-1,4-phenylene | —$CH_2CH_2CH_2$—O—$C_2H_5$ |
| 14 | 2,5-dihydroxy-1,4-phenylene | —$CH_2CH_2CH_2$—O—$CH_2CH_2CH_2CH_3$ |
| 15 | 2,5-dimethoxy-1,4-phenylene | para-chlorophenyl |
| 16 | 2,5-diethoxy-1,4-phenylene | ortho-bromophenyl |
| 17 | para-phenylene | —$CH_2CH_2OH$ |
| 18 | para-phenylene | ortho-toluyl |
| 19 | para-phenylene | meta-ethoxyphenyl |
| 20 | 1,4-naphthylene | n-butyl |
| 21 | 1,5-naphthylene | 2,4-dichlorophenyl |
| 22 | 2,6-naphthylene | meta-acetylaminophenyl |
| 23 | para-phenylene | ortho-chlorophenyl |
| 24 | para-phenylene | meta-chlorophenyl |
| 25 | 3,4-dibromo-thienylene-2,5* | —$C_6H_5$ |
| 26 | para-phenylene | 2-pyridyl |

EXAMPLE 27

42.2 Parts of the condensation product of terephthaldehyde and nicotinuric acid, of formula

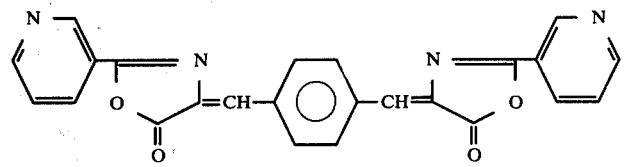

are heated to 130° over the course of 30 hours in an autoclave in the presence of 22 parts of sodium carbonate in 120 parts of water and 428 parts of concentrated ammonia solution. The pressure increases to approx. 6 atmospheres. A deep red product of formula

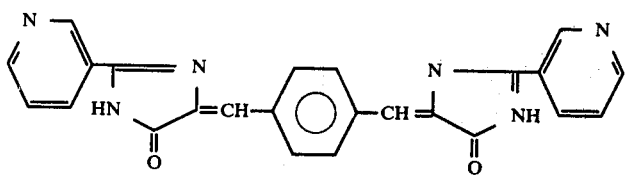

precipitates in pure form; it is washed to neutral with distilled water and finally dried. The product has a melting point of above 300° C., and has good pigment properties.

A very similar pigment is obtained by replacing the condensation product used as a starting material in Example 27, by that made by condensing picolinuric acid and terephthaldehyde of formula

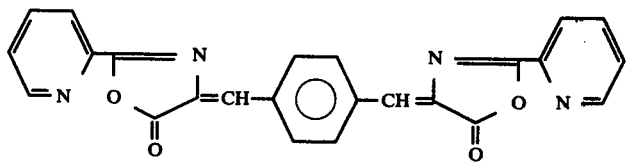

The pigment obtained corresponds to the formula

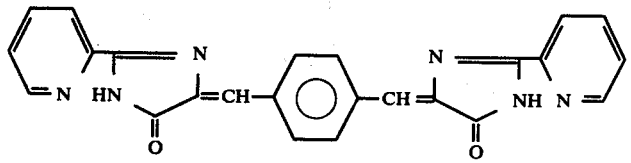

The following Table 2 dyes are shown which are obtained in analogy with the operating processes of Example 1 or 2. Each example again represents two dyes, i.e. $R_3 = O$ or $R_3 = N-R_2$. These dyes give dyeings of a brilliant yellow shade on polyester.

Table 2

| Example No. | $R_1$ | $R_2$ | $R_4$ |
|---|---|---|---|
| 28 | 1,4-Phenylene | —$C_6H_5$ | 2-Pyridyl |
| 29 | do. | do. | 3-Pyridyl |
| 30 | do. | do. | 4-Pyridyl |
| 31 | do. | do. | 2-Thienyl |
| 32 | do. | do. | 2-Pyrryl |
| 33 | do. | —$CH_2CH_2CH_2NHC_2H_5$ | 4-Nitrophenyl |
| 34 | do. | —$CH_2CH_2CH_2OC_2H_5$ | 2,4-Dichlorophenyl |
| 35 | 2-chloro-5-methyl phenylene | n-Butyl | 4-Bromophenyl |
| 36 | 2,5-Dimethoxy-1,4-phenylene | —$C_6H_5$ | 4-Cyanophenyl |
| 37 | 1,4-Phenylene | do. | 2-Hydroxyphenyl |
| 38 | do. | —$CH_2CH_2CH_2OCH_3$ | |
| 39 | do. | do. | 2,4-Dinitrophenyl |
| 40 | do. | do. | 2-Ethoxyphenyl |
| 41 | do. | do. | 3,4-Dimethoxyphenyl |
| 42 | do. | do. | 2-Acetoxyphenyl |
| 43 | do. | do. | 2-Methoxycarbonyl-phenyl |
| 44 | do. | do. | 2-Methoxycarbonyl--4-chlorophenyl |
| 45 | do. | do. | 1-Naphthyl |
| 46 | do. | do. | 2-Naphthyl |
| 47 | do. | do. | 2-Hydroxynaphthyl-3 |
| 48 | do. | n-Butyl | 2-Propionyloxyphenyl |
| 49 | do. | do. | 2-Ethoxycarbonyl-phenyl |
| 50 | do. | do. | 2-β-Methoxyethoxy-carbonyl-phenyl |
| 51 | do. | do. | 4-Acetylaminophenyl |
| 52 | 1,4-Phenylene | n-Butyl | 4-Propionylamino-phenyl |
| 53 | do. | —$C_6H_5$ | Pyrazinyl |
| 54 | do. | 2-Methylphenyl | 2-Acetylaminophenyl |
| 55 | do. | 3-Methoxyphenyl | 3-Chlorophenyl |
| 56 | do. | 2,4-Dimethylphenyl | do. |
| 57 | do. | 2,4-Dicyanophenyl | 3-Methylphenyl |
| 58 | do. | 2,4-Dinitrophenyl | do. |
| 59 | do. | 4-Nitrophenyl | do. |
| 60 | do. | 2-Cyanophenyl | do. |
| 61 | do. | 2-Methoxycarbonyl-phenyl | do. |

EXAMPLE 62

21 Parts of the compound of formula a in Example 1 are dissolved in 200 parts of n-butanol and heated to the boil under relux. Under the surface, dry ammonia-gas is introduced and at the same time, over a period of 10 minutes, 2.35 parts of aniline are added. The addition of ammonia-gas is continued for a further 10 minutes, and the colour of the suspension turns from orange to yellow. A further 1.9 parts aniline are added, the mixture is refluxed further for 40 minutes, cooled to room temperature, the precipitate is filtered, washed with ethanol and dried about at 80°. The product which corresponds to the formula

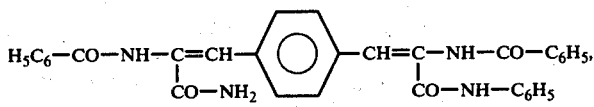

is suspended in 100 parts of phthalic acid diethylester and heated to 270°. Under these conditions the product is solubilized and cyclized. After cooling to room temperature, the precipitate is filtered, washed with ethanol and vacuum dried at 80°. The melting point of the dyestuff is over 300°; the mass spectrum shows that the compound which is at least 90% pure, corresponds to the formula

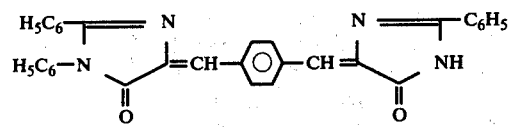

(m/e = 494)

Dyeings made with this disperse-dyestuff have good fastness properties.

APPLICATION EXAMPLE A

7 Parts of the dyestuff produced in accordance with Example 1 are ground to a fine powder for 48 hours in a ball mill together with 4 parts of the sodium salt of dinaphthylmethane-disulphonic acid; 4 parts of sodium cetylsulphate and 5 parts of anhydrous sodium sulphate.

1 Part of the dyeing preparation thus obtained is made into a paste with a little water and the suspension obtained is added through a sieve to a dye bath containing 3 parts of sodium lauryl sulphate in 4000 parts of water. The liquor ratio is 1:40. Then, 100 parts of purified polyester fibre material are added to the bath at 40° to 50°, 20 parts of a chlorinated benzene emulsified in water are added, the bath is heated slowly to 100° and dyeing takes place for 1 to 2 hours at 95° to 100°. The bright yellow dyed fibres are washed, saponified, washed again and dried. The even dyeing is fast to light, cross-dyeing, washing, water, sea water, perspiration, sublimation, gas fumes, thermofixation, pleating and permanent-press finish.

APPLICATION EXAMPLE B

To a basic mixture consisting of
63 parts of polyvinyl chloride emulsion
32 parts of dioctyl phthalate,
3 parts of commercial epoxy softener,
1.5 parts of stabilizer (barium-cadmium-stearate-mixture, also commercial) and
0.5 parts of a chelator (commercial)
are added 0.5 parts of the pigment of Example 3 and 5 parts of titanium dioxide pigment, and these are mixed together intimately.

The mixture is rolled for 8 minutes to obtain better pigment distribution in a roller mill heated to 160° C. and having friction rollers (one turning at 20, the other at 25 revolutions per minute), and the sheet obtained, which is of 0.3 mm thickness and has a yellow shade, is removed.

The dyeing is notably fast to light and migration, and is heat-resistant.

What is claimed is:

1. A compound of the formula

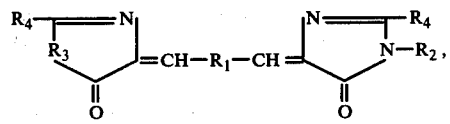

wherein $R_1$ is 1,4-phenylene, substituted 1,4-phenylene, naphthylene, substituted naphthylene, a bivalent radical of furan, thiophene, pyrrole or pyridine, each of which is unsubstituted or substituted, or a bivalent radical of benzofuran, benzothiophene, benzopyrrole or benzopyridine, in which the bonds are in the 2,5- or 2,6- or para-position, each of which is unsubstituted or substituted, wherein any substituted 1,4-phenylene, substituted naphthylene or substituted bivalent radical of furan, thiophene, pyrrole, pyridine, benzofuran, benzothiophene, benzopyrrole or benzopyridine has one or two substituents per ring independently selected from chloro, bromo, hydroxy, methyl, methoxy, ethoxy, trifluoromethyl, $(C_{2-4})$alkanoylamino, benzoylamino and nitro, with the proviso that with respect to the substituents selected from trifluoromethyl, $(C_{2-4})$alkanoylamino, benzoylamino and nitro, no more than one of any is present;

$R_2$ is hydrogen; $(C_{1-4})$alkyl; $(C_{1-4})$alkyl monosubstituted by chloro, bromo, hydroxy, $(C_{1-4})$alkoxy, $(C_{1-4})$alkylamino, di-$(C_{1-4})$alkylamino, $(C_{2-4})$alkanoyloxy, alkoxy $(C_{1-4})$carbonyl, alkoxy $(C_{1-4})$carbonyloxy or benzoyloxy; phenyl; phenyl substituted by one to three substituents independently selected from chloro, bromo, methyl, $(C_{1-4})$alkoxy, alkoxy $(C_{1-4})$carbonyl, cyano, nitro, hydroxy, $(C_{1-4})$alkylamino, di-$(C_{1-4})$alkylamino, $(C_{2-4})$alkanoylamino and alkoxy $(C_{1-4})$carbonylamino, with the provisos that: a) with respect to the substituents selected from $(C_{1-4})$alkoxy, alkoxy $(C_{1-4})$carbonyl, cyano and nitro, no more than two of any are present, and b) with respect to the substituents selected from hydroxy, $(C_{1-4})$alkylamino, di-$(C_{1-4})$alkylamino, $(C_{2-4})$alkanoylamino and alkoxy $(C_{1-4})$carbonylamino, no more than one of any is present; naphthyl; pyridyl-2; pyridyl-3; pyridyl-4; pyrimidyl-2; pyrimidyl-4; 2,4-dimethylpyrimidyl-6;

thienyl-2; thiazolyl-2; benzothiazolyl-2 or 5-methylisoxazolyl-3;

$R_3$ is oxygen or a group of the formula

wherein $R_5$ has one of the significances given above for $R_2$; and each $R_4$ is, independently, phenyl or naphthyl, each of which is unsubstituted or substituted by one to three substituents independently selected from chloro, bromo, methyl, $(C_{1-4})$alkoxy, nitro, hydroxy, cyano, $(C_{1-4})$alkylamino, di-$(C_{1-4})$alkylamino, alkoxy $(C_{1-4})$carbonyl, alkoxy $(C_{1-4})$alkoxy $(C_{1-4})$carbonyl, $(C_{2-4})$alkanoyloxy, $(C_{2-4})$alkanoylamino, alkoxy $(C_{1-4})$carbonylamino and sulpho, with the provisos that: a) with respect to the substituents selected from $(C_{1-4})$alkoxy and nitro, no more than two of any are present, and b) with respect to the substituents selected from hydroxy, cyano $(C_{1-4})$alkylamino, di-$(C_{1-4})$alkylamino, alkoxy $(C_{1-4})$carbonyl, alkoxy $(C_{1-4})$alkoxy $(C_{1-4})$carbonyl, $(C_{2-4})$alkanoyloxy, $(C_{2-4})$alkanoylamino, alkoxy $(C_{1-4})$carbonylamino and sulpho, no more than one of any is present; pyridyl-2; pyridyl-3; pyridyl-4; pyrazinyl; thienyl-2; pyrryl-2 or pyrryl-3;

with the proviso that at least one of substituents $R_1$, $R_2$, $R_3$ and $R_4$ is a heterocycle; or a mixture of compounds of the above formula.

2. A compound of formula I,

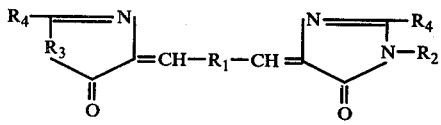

wherein $R_1$ is 1,4-phenylene; naphthylene; substituted 1,4-phenylene or substituted naphthylene, wherein substituted 1,4-phenylene or substituted naphthylene has one or two substituents independently selected from chloro, bromo, hydroxy, methyl, methoxy, ethoxy, trifluoromethyl, $(C_{2-4})$alkanoylamino, benzoylamino and nitro, with the proviso that with respect to the substituents selected from trifluoromethyl, $(C_{2-4})$alkanoylamino, benzoylamino and nitro, no more than one of any is present;

either $R_2$ is pyridyl-2; pyridyl-3; pyridyl-4; pyrimidyl-2; pyrimidyl-4; 2,4-dimethylpyrimidyl-6; thienyl-2; thiazolyl-2; benzothiazolyl-2 or 5-methylisoxazolyl-3; and each $R_4$ is, independently, phenyl; naphthyl; substituted phenyl or substituted naphthyl, wherein substituted phenyl or substituted naphthyl has one to three substituents independently selected from chloro, bromo, methyl, $(C_{1-4})$alkoxy, nitro, hydroxy, cyano, $(C_{1-4})$alkylamino, di-$(C_{1-4})$alkylamino, alkoxy $(C_{1-4})$carbonyl, alkoxy $(C_{1-4})$alkoxy $(C_{1-4})$carbonyl, $(C_{2-4})$alkanoyloxy, $(C_{2-4})$alkanoylamino, alkoxy $(C_{1-4})$carbonylamino and sulpho, with the provisos that: a) with respect to the substituents selected from $(C_{1-4})$alkoxy and nitro, no more than two of any are present, and b) with respect to the substituents selected from hydroxy, cyano, $(C_{1-4})$alkylamino, di-$(C_{1-4})$alkylamino, alkoxy $(C_{1-4})$carbonyl, alkoxy $(C_{1-4})$alkoxy $(C_{1-4})$carbonyl, $(C_{2-4})$alkanoyloxy, $(C_{2-4})$alkanoylamino, alkoxy $(C_{1-4})$carbonylamino and sulpho, no more than one of any is present;

or $R_2$ is hydrogen; $(C_{1-4})$alkyl; $(C_{1-4})$alkyl monosubstituted by chloro, bromo, hydroxy, $(C_{1-4})$alkoxy, $(C_{1-4})$alkylamino, di-$(C_{1-4})$alkylamino, $(C_{2-4})$alkanoyloxy, alkoxy $(C_{1-4})$carbonyl, alkoxy $(C_{1-4})$carbonyloxy or benzoyloxy; phenyl; phenyl substituted by one to three substituents independently selected from chloro, bromo, methyl, $(C_{1-4})$alkoxy, alkoxy $(C_{1-4})$carbonyl, cyano, nitro, hydroxy, $(C_{1-4})$alkylamino, di-$(C_{1-4})$alkylamino, $(C_{2-4})$alkanoylamino and alkoxy $(C_{1-4})$carbonylamino, with the provisos that: a) with respect to the substituents selected from $(C_{1-4})$alkoxy, alkoxy $(C_{1-4})$carbonyl, cyano and nitro, no more than two of any are present, and b) with respect to the substituents selected from hydroxy, $(C_{1-4})$alkylamino, di-$(C_{1-4})$alkylamino, $(C_{2-4})$alkanoylamino and alkoxy $(C_{1-4})$carbonylamino, no more than one of any is present; or naphthyl; and each $R_4$ is, independently, pyridyl-2; pyridyl-3; pyridyl-4; pyrazinyl; thienyl-2; pyrryl-2 or pyrryl-3; and $R_3$ is oxygen or a group of the formula

wherein $R_5$ has one of the significances given above for $R_2$;

or a mixture of compounds of formula I.

3. A compound or a mixture of compounds according to claim 2, wherein each $R_4$ is, independently, phenyl; naphthyl; substituted phenyl or substituted naphthyl, wherein substituted phenyl or substituted naphthyl has one to three substituents independently selected from chloro, bromo, methyl, $(C_{1-4})$alkoxy, nitro, hydroxy, cyano, $(C_{1-4})$alkylamino, di-$(C_{1-4})$alkylamino, alkoxy $(C_{1-4})$carbonyl, alkoxy $(C_{1-4})$alkoxy $(C_{1-4})$carbonyl, $(C_{2-4})$alkanoyloxy, $(C_{2-4})$alkanoylamino, alkoxy $(C_{1-4})$carbonylamino and sulpho, with the provisos that: a) with respect to the substituents selected from $(C_{1-4})$alkoxy and nitro, no more than two of any are present, and b) with respect to the substituents selected from hydroxy, cyano, $(C_{1-4})$alkylamino, di-$(C_{1-4})$alkylamino, alkoxy $(C_{1-4})$carbonyl, alkoxy $(C_{1-4})$alkoxy $(C_{1-4})$carbonyl, $(C_{2-4})$alkanoyloxy, $(C_{2-4})$alkanoylamino, alkoxy $(C_{1-4})$carbonylamino and sulpho, no more than one of any is present.

4. A compound or a mixture of compounds according to claim 2, wherein each $R_4$ is, independently, pyridyl-2; pyridyl-3; pyridyl-4; pyrazinyl; thienyl-2; pyrryl-2 or pyrryl-3.

5. A compound or a mixture of compounds according to claim 2, in which $R_3$ is oxygen.

6. A compound or a mixture of compounds according to claim 2, in which $R_3$ is $>N-R_5$.

7. A compound according to claim 2, of formula Ia,

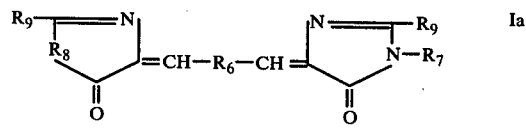

wherein $R_6$ is 1,4-phenylene; substituted 1,4-phenylene having one or two substituents independently selected from chloro, bromo, hydroxy, methyl, methoxy and ethoxy; 1,4-naphthylene; 1,5-naphthylene or 2,6-naphthylene;
either $R_7$ is pyridyl-2; and
each $R_9$ is phenyl; substituted phenyl having one or two substituents selected from chloro, bromo, nitro, methyl, $(C_{1-4})$ alkoxy, cyano, hydroxy, acetoxy, propionyloxy, methoxycarbonyl, ethoxycarbonyl, methoxyethoxycarbonyl, acetylamino, propionylamino and sulpho, with the proviso that with respect to the substituents selected from cyano, hydroxy, acetoxy, propionyloxy, methoxycarbonyl, ethoxycarbonyl, methoxyethoxycarbonyl, acetylamino, propionylamino and sulpho, no more than one of any is present; naphthyl-1; naphthyl-2; naphthyl-1 or naphthyl-2 monosubstituted by sulpho; 2-hydroxynaphthyl-3 or 2-hydroxysulphonaphthyl-3; with the proviso that the two $R_9$'s are identical;
or $R_7$ is hydrogen; $(C_{1-4})$ alkyl; $(C_{1-4})$ alkyl monosubstituted by hydroxy, $(C_{1-4})$ alkoxy, $(C_{1-4})$ alkylamino or di-$(C_{1-4})$ alkylamino; phenyl or substituted phenyl having one or two substituents selected from chloro, bromo, methyl, cyano, nitro, $(C_{1-4})$ alkoxy, $(C_{1-4})$ alkoxycarbonyl, acetylamino and propionylamino, with the proviso that with respect to the substituents selected from $(C_{1-4})$ alkoxy, $(C_{1-4})$ alkoxycarbonyl, acetylamino and propionylamino, no more than one of any is present; and
each $R_9$ is pyridyl-2; pyridyl-3, pyridyl-4, thienyl-2, pyrryl-2, pyrryl-3 or pyrazinyl, with the proviso that the two $R_9$'s are identical;
$R_8$ is oxygen or a group of the formula

wherein $R_7$ is as defined above;
or a mixture of compounds of formula Ia.

8. A compound or a mixture of compounds according to claim 7, wherein $R_7$ is hydrogen; $(C_{1-4})$ alkyl; $(C_{1-4})$ alkyl monosubstituted by hydroxy, $(C_{1-4})$ alkoxy, $(C_{1-4})$ alkylamino or di-$(C_{1-4})$ alkylamino; phenyl or substituted phenyl having one or two substituents selected from chloro, bromo, methyl, cyano, nitro, $(C_{1-4})$ alkoxy, $(C_{1-4})$ alkoxycarbonyl, acetylamino and propionylamino, with the proviso that with respect to the substituents selected from $(C_{1-4})$ alkoxy, $(C_{1-4})$ alkoxycarbonyl, acetylamino and propionylamino, no more than one of any is present.

9. A compound or a mixture of compounds according to claim 7, wherein $R_7$ is pyridyl-2.

10. A compound or a mixture of compounds according to claim 7, in which $R_8$ is oxygen.

11. A compound or a mixture of compounds according to claim 7, in which $R_8$ is $>N-R_7$.

12. A compound or a mixture of compounds according to claim 7, in which $R_6$ is 1,4-phenylene.

13. A compound or a mixture of compounds according to claim 7, wherein $R_6$ is 1,4-phenylene or substituted 1,4-phenylene having one or two substituents independently selected from chloro, methyl and methoxy.

14. A compound or a mixture of compounds according to claim 13, wherein either $R_7$ is pyridyl-2; or $R_7$ is hydrogen; $C_{1-4}$ alkyl; $(C_{1-4})$ alkyl monosubstituted by hydroxy, methoxy, ethoxy, methylamino, dimethylamino, ethylamino or diethylamino; phenyl or substituted phenyl having one or two substituents selected from chloro, bromo, methyl, methoxy, ethoxy, methoxycarbonyl and ethoxycarbonyl, with the proviso that with respect to the substituents selected from methoxy, ethoxy, methoxycarbonyl and ethoxycarbonyl, no more than one of any is present.

15. A compound or a mixture of compounds according to claim 13, wherein either $R_7$ is pyridyl-2; or $R_7$ is hydrogen; $(C_{1-4})$ alkyl; $(C_{1-4})$ alkyl monosubstituted by hydroxy, methoxy, ethoxy or dimethylamino; phenyl or substituted phenyl having one or two substituents selected from chloro, bromo, methyl, methoxy, ethoxy, methoxycarbonyl and ethoxycarbonyl, with the proviso that with respect to the substituents selected from methoxy, ethoxy, methoxycarbonyl and ethoxycarbonyl, no more than one of any is present.

16. A compound or a mixture of compounds according to claim 13, wherein $R_7$ is hydrogen; phenyl or phenyl monosubstituted by chloro, methyl, methoxycarbonyl or ethoxycarbonyl.

17. A compound or a mixture of compounds according to claim 13, wherein either each $R_9$ is phenyl or substituted phenyl having one or two substituents selected from chloro, bromo, methyl, cyano, nitro, methoxy, ethoxy, methoxycarbonyl and ethoxycarbonyl, with the proviso that with respect to the substituents selected from cyano, nitro, methoxy, ethoxy, methoxycarbonyl and ethoxycarbonyl, no more than one of any is present; or each $R_9$ is pyridyl-2, pyridyl-3 or pyridyl-4, with the proviso that in each case, the two $R_9$'s are identical.

18. A compound or a mixture of compounds according to claim 13, wherein each $R_9$ is phenyl.

19. A compound or a mixture of compounds according to claim 2, wherein $R_2$ and $R_5$, in the case where $R_3$ is a group of formula $>N-R_5$, are hydrogen.

20. A process for pigmenting plastics in the mass comprising incorporating as the pigmenting agent a compound or mixture of compounds according to claim 19.

21. A process for pigmenting paper in the stock comprising incorporating as the pigmenting agent a compound or mixture of compounds according to claim 19.

22. A compound or a mixture of compounds according to claim 2, wherein each $R_4$ is, independently, substituted phenyl or substituted naphthyl wherein one substituent thereon is a sulphonic acid group, or an alkali metal salt or salts of such compound or mixture of compounds.

23. A process for dyeing substrates selected from natural polyamides, synthetic polyamides, cellulose fibers and paper comprising applying as the dyeing agent a compound or mixture of compounds according to claim 22.

24. A compound or a mixture of compounds according to claim 2, wherein either $R_2$ is pyridyl-2; pyridyl-3; pyridyl-4; pyrimidyl-2; pyrimidyl-4; 2,4-dimethylpyrimidyl-6; thienyl-2; thiazolyl-2; benzothiazolyl-2 or 5-methylisoxazolyl-3; or $R_2$ is hydrogen; $(C_{1-4})$ alkyl; $(C_{1-4})$ alkyl monosubstituted by chloro, bromo, hydroxy, $(C_{1-4})$ alkoxy, $(C_{1-4})$ alkylamino, di-$(C_{1-4})$ alkylamino, $(C_{2-4})$ alkanoyloxy, alkoxy $(C_{1-4})$ carbonyl, alkoxy $(C_{1-4})$ carbonyloxy or benzoyloxy; naphthyl; phenyl or phenyl substituted by one to three substituents independently selected from chloro, bromo, methyl, $(C_{1-4})$ alkoxy, alkoxy $(C_{1-4})$ carbonyl, cyano, nitro, hydroxy, $(C_{1-4})$ alkylamino, di-$(C_{1-4})$ alkylamino, $(C_{2-4})$ alkanoylamino and alkoxy $(C_{1-4})$ carbonylamino; and $R_5$, in the case where $R_3$ is a group of formula >N—R$_5$, has one of the significances given above for R$_2$, with the provisos that: a) with respect to the substituents selected from (C$_{1-4}$) alkoxy, alkoxy (C$_{1-4}$) carbonyl, cyano and nitro, no more than two of any is present, b) with respect to the substituents selected from hydroxy, (C$_{1-4}$) alkylamino, di-(C$_{1-4}$) alkylamino, (C$_{2-4}$) alkanoylamino and alkoxy (C$_{1-4}$) carbonylamino, no more than one of any is present, and c) R$_2$ and R$_5$ cannot simultaneously signify hydrogen, which compound or mixture of compounds is free from sulphonic acid groups or salts thereof.

25. A process for dyeing substrates of semi-synthetic or synthetic hydrophobic, high molecular weight organic materials comprising applying as the dyeing agent a compound or mixture of compounds according to claim 24.

26. A process for printing substrates of semi-synthetic or synthetic hydrophobic, high molecular weight organic materials comprising applying as the printing agent a compound or mixture of compounds according to claim 24.

* * * * *

UNITED STATES PATENT AND TRADEMARK OFFICE
CERTIFICATE OF CORRECTION

PATENT NO. : 4,142,043

DATED : February 27, 1979

INVENTOR(S) : Werner Koch

It is certified that error appears in the above-identified patent and that said Letters Patent are hereby corrected as shown below:

Columns 14 and 15, Claim 1 should be deleted in its entirety.

Column 17, line 64, change "$C_{1-4}$)alkyl" to --($C_{1-4}$)alkyl--.

Signed and Sealed this

First Day of April 1980

[SEAL]

Attest:

SIDNEY A. DIAMOND

Attesting Officer

Commissioner of Patents and Trademarks